(12) United States Patent
Shizume

(10) Patent No.: US 7,197,039 B2
(45) Date of Patent: Mar. 27, 2007

(54) BRIDGE APPARATUS WITH ENTRIES REDUCED IN FILTERING DATABASE AND NETWORK USING THE SAME

(75) Inventor: Dai Shizume, Tokyo (JP)

(73) Assignee: NEC Corporation, Tokyo (JP)

( * ) Notice: Subject to any disclaimer, the term of this patent is extended or adjusted under 35 U.S.C. 154(b) by 1080 days.

(21) Appl. No.: 10/152,101

(22) Filed: May 21, 2002

(65) Prior Publication Data

US 2002/0181478 A1 Dec. 5, 2002

(30) Foreign Application Priority Data

May 30, 2001 (JP) ............................. 2001-161542

(51) Int. Cl.
*H04L 12/28* (2006.01)
*H04L 12/66* (2006.01)
(52) U.S. Cl. ................. 370/401; 370/395.31; 711/202; 711/216
(58) Field of Classification Search ................ 370/401, 370/395.31; 711/202, 216
See application file for complete search history.

(56) References Cited

U.S. PATENT DOCUMENTS

| | | | | | |
|---|---|---|---|---|---|
| 6,131,119 | A * | 10/2000 | Fukui | ......................... | 709/224 |
| 6,442,170 | B1 * | 8/2002 | Perlman et al. | ............. | 370/401 |
| 6,594,272 | B1 * | 7/2003 | Ketcham et al. | ............ | 370/428 |
| 6,650,639 | B2 * | 11/2003 | Doherty et al. | ............. | 370/389 |
| 6,751,225 | B1 * | 6/2004 | Chung | ......................... | 370/401 |
| 6,807,176 | B1 * | 10/2004 | Egbert et al. | ............... | 370/392 |
| 6,816,490 | B1 * | 11/2004 | Chung | ......................... | 370/392 |
| 6,873,619 | B1 * | 3/2005 | Edwards | ..................... | 370/392 |
| 6,996,099 | B1 * | 2/2006 | Kadambi et al. | .......... | 370/389 |
| 2002/0085507 | A1 * | 7/2002 | Ku et al. | ..................... | 370/255 |

FOREIGN PATENT DOCUMENTS

JP 01-189252 A 7/1989

(Continued)

OTHER PUBLICATIONS

"Architecture for High Performance Transparent Bridges", Jul. 1, 1992, IBM Technical Disclosure Bulletin, Jul. 1992, US, vol. No. 35, Issue No. 2, pp. 233-239.*

*Primary Examiner*—Alpus H. Hsu
(74) *Attorney, Agent, or Firm*—Scully, Scott, Murphy & Presser, P.C.

(57) ABSTRACT

A bridge apparatus includes a filtering database and a switch section. The filtering database stores sets of a source address of a transmission source bridge apparatus from which a frame has been transmitted and one of ports of the bridge apparatus through which the frame is received. The transmission source bridge apparatus address comprises a subnet ID, a node ID and a port ID, the subnet ID is an ID allocated to a subnet to which the transmission source bridge apparatus belongs, and the node ID is an ID allocated to the transmission source bridge apparatus. The port ID is an ID allocated to each of ports of the transmission source bridge apparatus. The switch section is connected with the ports of the bride apparatus and refers to the filtering database based on a destination address of a transmission frame to determine one port of the bridge apparatus as an output port from which the transmission frame is outputted, when the transmission frame is received through another of the ports of the bridge apparatus.

15 Claims, 8 Drawing Sheets

FOREIGN PATENT DOCUMENTS

| | | |
|---|---|---|
| JP | 01-309545 A | 12/1989 |
| JP | A-HEISEI 5-344125 | 12/1993 |
| JP | A-HEISEI 9-64899 | 3/1997 |
| JP | H9-107377 | 4/1997 |
| JP | A-HEISEI 9-307579 | 11/1997 |
| JP | A-HEISEI 10-32597 | 2/1998 |
| JP | A-HEISEI 10-150459 | 6/1998 |
| JP | H11-215186 | 8/1999 |
| JP | H11-308243 | 11/1999 |
| JP | 2000-022736 A | 1/2000 |
| JP | 2002-16638 A | 1/2002 |

* cited by examiner

| ADDRESS | PORT |
|---------|------|
| MAC1 | P1 |
| MAC2 | P1 |
| MAC3 | P1 |
| MAC4 | P1 |
| MAC5 | P1 |
| MAC6 | P1 |
| MAC7 | P1 |
| MAC8 | P1 |
| MAC9 | P2 |

BRIDGE APPARATUS WITH ENTRIES REDUCED IN FILTERING DATABASE AND NETWORK USING THE SAME

BACKGROUND OF THE INVENTION

1. Field of the Invention

The present invention relates to a bridge apparatus and a network using the bridge apparatus. More particularly, the present invention relates to an address allocating technique to a bridge port of a bridge apparatus for connecting between networks in SONET (synchronous optical network)/SDH (synchronous digital hierarchy) network.

2. Description of the Related Art

Figure 1:
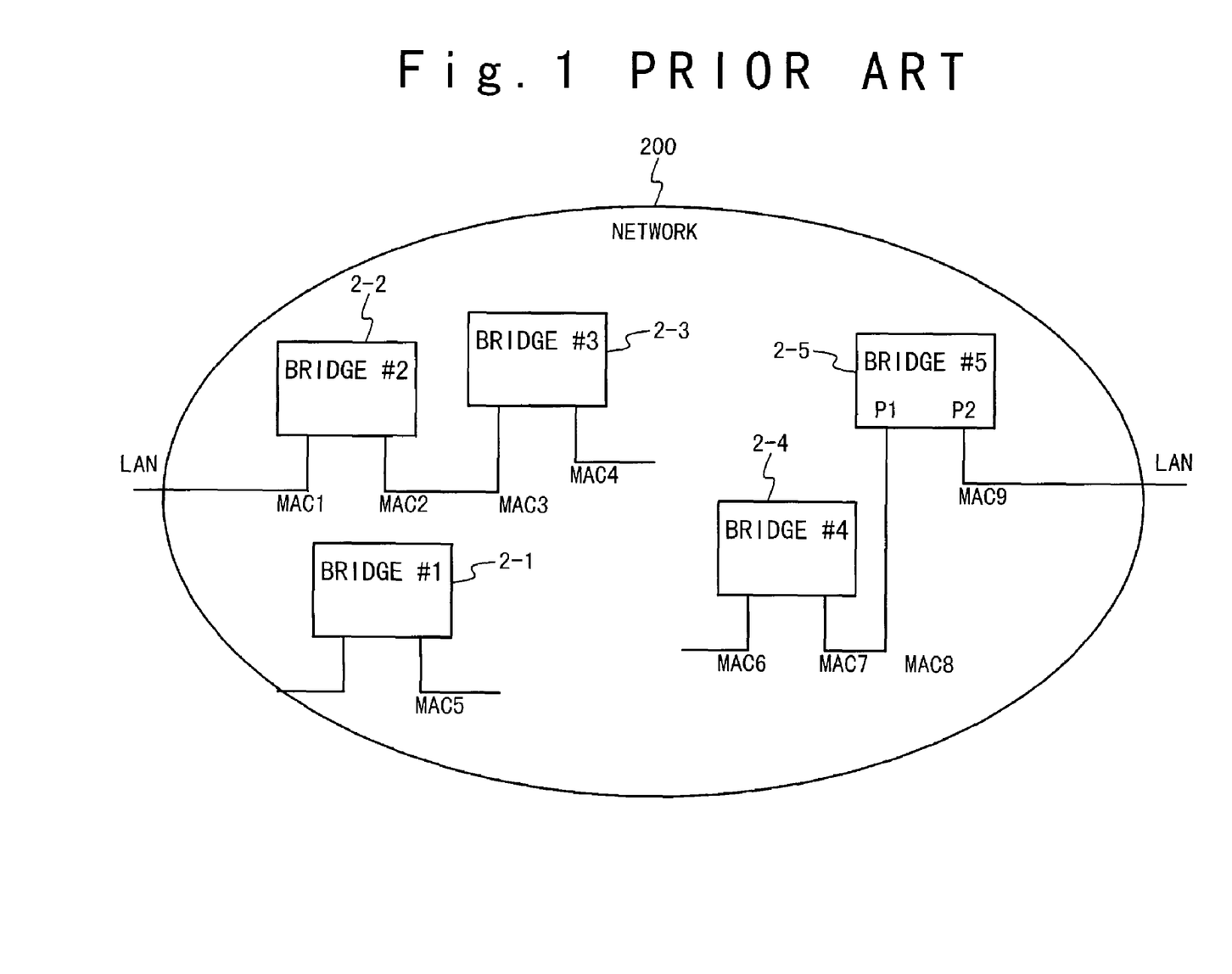
FIG. 1 is a diagram showing the configuration of a conventional example of SONET/SDH/SDH network.

Conventionally, in a bridge apparatus used in a LAN (Local Area Network), an address allocating method to a bridge port is used as shown in FIG. 1. Referring to FIG. 1, a network 200 is used to connect between LANs (Local Area Network) (not shown). Bridge apparatuses (#1 to #5) 2-1 to 2-5 are provided in the network 200, and each of the bride apparatus 2-1 to 2-5 has bridge ports. MAC (media access control) addresses (MAC1 to MAC9) are addresses peculiar to the network 200 (so-called local addresses), and are allocated to the bridge ports of the bridge apparatuses (#1 to #5) 2-1 to 2-5. In this case, one address is uniquely allocated to the bridge port. Also, the MAC address is defined in 48 bits.

Also, each of the bridge apparatuses 2-1 to 2-5 uses a filtering database (not shown) to determine from which of the bridge ports a frame received through one bridge port should be transmitted, i.e., to carry out a filtering process. In an initial stage, no data is registered on the filtering database. By carrying out the following operations, data are registered onto the filtering database. Generally, this operation is called a filtering database building operation or a learning operation.

Figure 2:
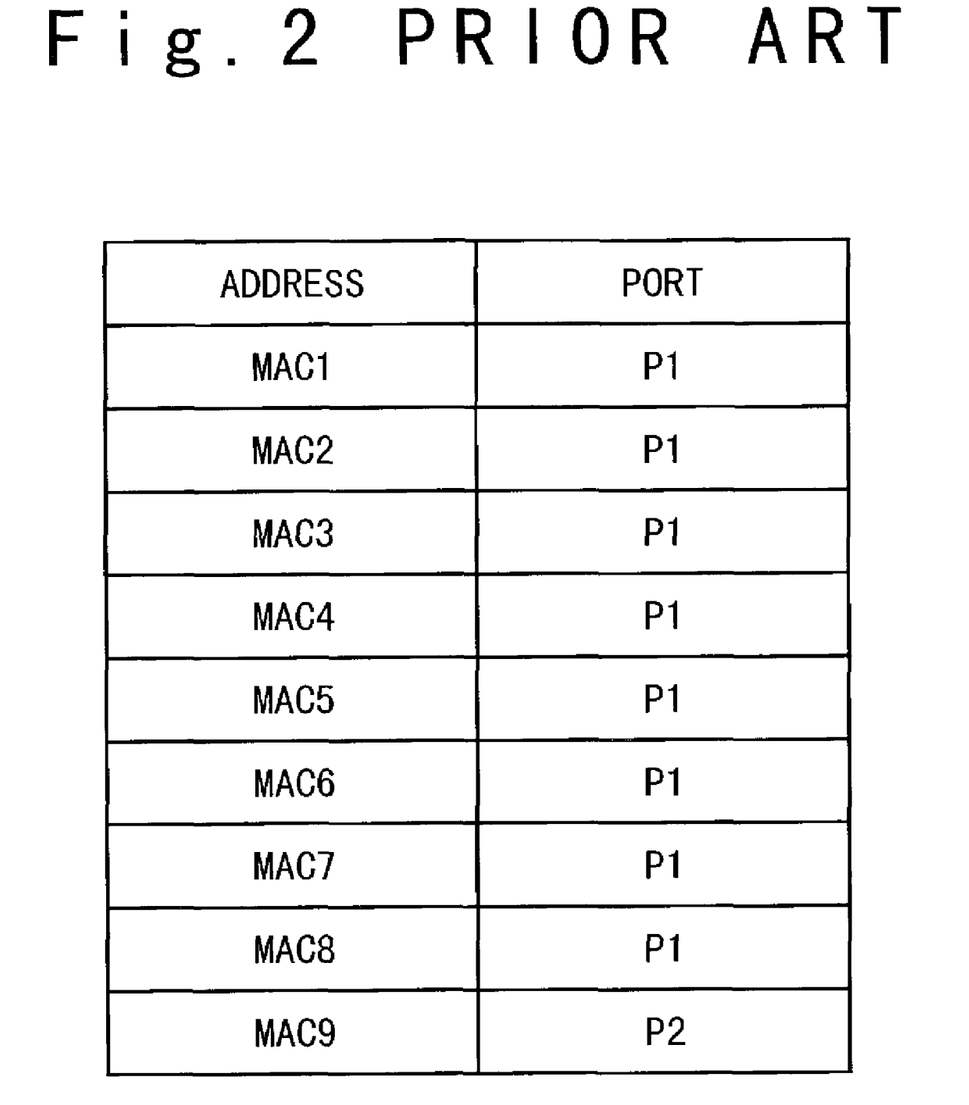
FIG. 2 is a diagram showing a filtering database produced in GFP bridge apparatus (#5) of FIG. 1.

FIG. 2 shows a configuration example of the filtering database of the bridge apparatus 2-5. Referring to FIG. 2, data of the bridge port is registered on the filtering database in correspondence to each of the MAC addresses (MAC1 to MAC9) in network 200. The filtering database building operation to the filtering database of the bridge apparatus 2-5 will be described with reference to FIGS. 1 and 2.

In the initial stage, when a frame is received from the bridge port with the address MAC1 of the bridge apparatus 2-2 by the bridge port P1 of itself, the bridge apparatus 2-5 refers to the filtering database to check from which of the bridge ports a frame should be transmitted. However, no data is now registered on the filtering database. For this reason, the bridge apparatus 2-5 outputs the frame to all the bridge ports of itself. Also, the bridge apparatus 2-5 registers the bridge port P1 in a port field of the filtering database corresponding to the address MAC1.

Next, when a frame is received from the bridge port with the address MAC2 of the bridge apparatus 2-2 by the bridge port P1 of itself, the bridge apparatus 2-5 outputs the frame to all the bridge ports of itself, as in the above case. Then, the bridge apparatus 2-5 registers the bridge port P1 in a port field of the filtering database corresponding to the address MAC2.

In this way, data of the bridge port is registered on the port field of the filtering database corresponding to each of the MAC addresses (MAC1 to MAC9). In this case, all the MAC addresses (MAC1 to MAC9) to which the frames possibly arrive in the network 200 need to be registered on the filtering database.

However, in the system for allocating the addresses to the bridge ports of the bridge apparatus used in the above-mentioned conventional network, each of the bridge apparatuses identifies a port based on the 48-bit in-network MAC address, and the filtering database is built through the learning process of the MAC address. Therefore, when the bridge function is applied to a large-scaled network such as SONET (synchronous optical network)/SDH (synchronous digital hierarchy) network, there would be a problem that the number of entries increases in accordance with the scale of the network.

In conjunction with the above description, a filtering system of MAC address is disclosed in Japanese Laid Open Patent application (JP-A-Heisei 5-344125). In this reference, when a frame is transferred from a transmission route 1 to a node 2, it is determined whether the address of the frame is a broadcasting MAC address, a group MAC address or an individual MAC address. When the address of the frame is the broadcasting MAC address or the group MAC address, a software filtering is carried out. In case of the individual MAC address, a hardware filtering is carried out. Because a reception frequency of the group MAC address and the broadcasting MAC address is low, influences of the software filtering process to the overall filtering performance is low. The increase of registers in the filtering circuit and complication of a comparing circuit are prevented.

Also, a multi-port relay apparatus is disclosed in Japanese Laid Open Patent application (JP-A-Heisei 9-307579). In this reference, a multi-port relay apparatus has a plurality of ports and relays a frame between the ports. A virtual LAN address is allocated to a network apparatus connected to the port and can replace with a MAC address. The virtual LAN address has a flag showing that the address is a local address of the MAC address, a flag showing that the address is the virtual LAN address, an identification number of a virtual LAN group to which the network apparatus belongs, an identification number of the multi-port relay apparatus with which the network apparatus is connected, and a termination network equipment identification number for specifying the network apparatus with the address.

Also, a switching hub module is disclosed in Japanese Laid Open Patent application (JP-A-Heisei 9-64899). In this reference, the switching hub is comprised of a plurality of ports connected with a network, port interface modules for these ports, a higher rank module provided for the port interface modules to communicate with a host, and a filtering database which learns a transmission source MAC address of a reception frame in correspondence to the port, and searches one port based on a transmission destination address of the reception frame. A virtual port is provided in the above interface module to communicate with the higher rank module. The learning process of the MAC address and the searching of the filtering database are carried out to the virtual port, like the other ports. A MAC frame is assembled by setting the MAC address allocated to the above higher rank module in a transmission source address field of a MAC header part of the frame. The MAC frame is transmitted to the virtual port of the above interface module.

Also, a connection apparatus between LANs is disclosed in Japanese Laid Open Patent application (JP-A-Heisei 10-32597). In this reference, a bridge module 12 learns a transmission source MAC address, a subnet address of a transmission source network layer and a reception port and registers on a bridge table. Also, the bridge module 12 refers to the bridge table to carries out a bridging operation to a transmission destination MAC address, a transmission destination network layer address. Before deleting entries of ARP table and the bridge table when the lifetime comes, ARP module 13 transmits a request and updates the ARP table and the bridge table based on an ARP reply packet.

Also, a switching hub with a virtual LAN function is disclosed in Japanese Laid Open Patent application (JP-A-Heisei 10-150459). In this reference, the switching hub has a plurality of ports, and a filtering table to register a MAC address of a terminal, the port connected with the terminal, and a virtual LAN group to which the terminal belongs. A plurality of regions are provided for the filtering table to store identification data of the virtual LAN. A virtual LAN group is specified in a combination of the identification data stored in each region.

SUMMARY OF THE INVENTION

Therefore, an object of the present invention is to provide a bridge apparatus, in which the number of entries of a filtering database in the bridge apparatus can be reduced.

Another object of the present invention is to provide a network using the above bridge apparatus.

In an-aspect of the present invention, a bridge apparatus includes a filtering database and a switch section. The filtering database stores sets of a source address of a transmission source bridge apparatus from which a frame has been transmitted and one of ports of the bridge apparatus through which the frame is received. The transmission source bridge apparatus address comprises a subnet ID, a node ID and a port ID, the subnet ID is an ID allocated to a subnet to which the transmission source bridge apparatus belongs, and the node ID is an ID allocated to the transmission source bridge apparatus. The port ID is an ID allocated to each of ports of the transmission source bridge apparatus. The switch section is connected with the ports of the bride apparatus and refers to the filtering database based on a destination address of a transmission frame to determine one port of the bridge apparatus as an output port from which the transmission frame is outputted, when the transmission frame is received through another of the ports of the bridge apparatus.

Here, the switch section may refer to the filtering database based on one of a first address group of the subnet ID, a second address group of the subnet ID and the node ID, and a third address group of the subnet ID, the node ID and the port ID. Also, the ports may be grouped based on each of the first to third address groups.

Also, the switching section:

may refer to the filtering database based on the subnet ID of the destination address of the transmission frame to check whether the destination address of the transmission frame belongs to the subnet to which the bridge apparatus belongs, and may determine the output port based on the subnet ID when the destination address does not belong to the subnet to which the bridge apparatus belongs.

Also, the switching section:

may refer to the filtering database based on the node ID of the destination address to check whether the node ID of the destination address of the transmission frame is same as the node ID of the bridge apparatus, when the destination address does not belong to the subnet to which the bridge apparatus belongs;

may determine the output port based on the subnet ID and the node ID when the node ID of the destination address of the transmission frame is not same as the node ID of the bridge apparatus; and may determine the output port based on the subnet ID, the node ID and the port ID of the destination address when the node ID of the destination address of the transmission frame is same as the node ID of the bridge apparatus.

Also, it is desirable that a transmission route from one subnet to another subnet is at most one.

Also, the bridge apparatus may further include a building section which:

checks whether a source address of the frame belongs to the subnet to which the bridge apparatus belongs, and registers the subnet ID as the address and the output port through which the frame has received, on the filtering database when the source address does not belong to the subnet to which the bridge apparatus belongs.

In this case, the building section:

may check whether the node ID of the source address of the frame is same as the node ID of the bridge apparatus, when the source address belongs to the subnet to which the bridge apparatus belongs;

may register a group of the subnet ID and the node ID as the address and the output port which the frame has received, on the filtering database when the node ID of the source address of the frame is not same as the node ID of the bridge apparatus; and may register a group of the subnet ID, the node ID and the port ID of the source address as the address and the output port which the frame has received, on the filtering database when the node ID of the source address of the frame is same as the node ID of the bridge apparatus.

In another aspect of the present invention, a network may include a plurality of bridge apparatuses mentioned above. The network is divided into a plurality of subnets, and each of the plurality of bridge apparatuses belongs to one or more of the plurality of subnets. The subnet ID is allocated to each of the plurality of subnets, and the node ID is allocated to each of the plurality of bridge apparatuses.

In another aspect of the present invention, a method of transfer a frame in a specific bridge apparatus, is achieved by dividing a network of a plurality of bridge apparatuses into a plurality of subnets, to allocate a subnet ID to each of the plurality of subnets, each of the plurality of bridge apparatuses being allocated with a node ID and having a plurality of ports, each of which is allocated with a port ID; by in the specific bridge apparatus, checking whether a source address of a frame belongs to the subnet to which the specific bridge apparatus belongs, when the frame is received through one of the ports of the specific bridge apparatus as an output port; and by in the specific bridge apparatus, registering the subnet ID as the address and the output port on the filtering database when the source address does not belong to the subnet to which the specific bridge apparatus belongs.

Also, the method may be further achieved by in the specific bridge apparatus, checking whether the node ID of the source address of the frame is same as the node ID of the specific bridge apparatus, when the source address belongs to the subnet to which the specific bridge apparatus belongs; by in the specific bridge apparatus, registering a group of,the subnet ID and the node ID as the address and the output port on the filtering database when the node ID of the source address of the frame is not same as the node ID of the specific bridge apparatus; and by in the specific bridge apparatus, registering a group of the subnet ID, the node ID and the port ID of the source address as the address and the output port on the filtering database when the node ID of the source address of the frame is same as the node ID of the specific bridge apparatus.

Also, the method may be further achieved by providing the filtering database; by in the specific bridge apparatus, referring to the filtering database based on the subnet ID of a destination address of a transmission frame to check whether the destination address of the transmission frame belongs to the subnet to which the specific bridge apparatus belongs; and by in the specific bridge apparatus, determining the output port based on the subnet ID when the destination address does not belong to the subnet to which the specific bridge apparatus belongs.

Also, the method may be further achieved by in the specific bridge apparatus, referring to the filtering database based on the node ID of the destination address to check whether the node ID of the destination address of the transmission frame is same as the node ID of the specific bridge apparatus, when the destination address does not belong to the subnet to which the specific bridge apparatus belongs; by in the specific bridge apparatus, determining the output port based on the subnet ID and the node ID when the node ID of the destination address of the transmission frame is not same as the node ID of the specific bridge apparatus; and by in the specific bridge apparatus, determining the output port based on the subnet ID, the node ID and the port ID of the destination address when the node ID of the destination address of the transmission frame is same as the node ID of the specific bridge apparatus.

DESCRIPTION OF THE PREFERRED EMBODIMENTS

Hereinafter, a SONET (synchronous optical network)/SDH (synchronous digital hierarchy) network comprised of GFP (Generic Framing Procedure) bridge apparatuses of the present invention will be described with reference to the attached drawings.

Figure 3:
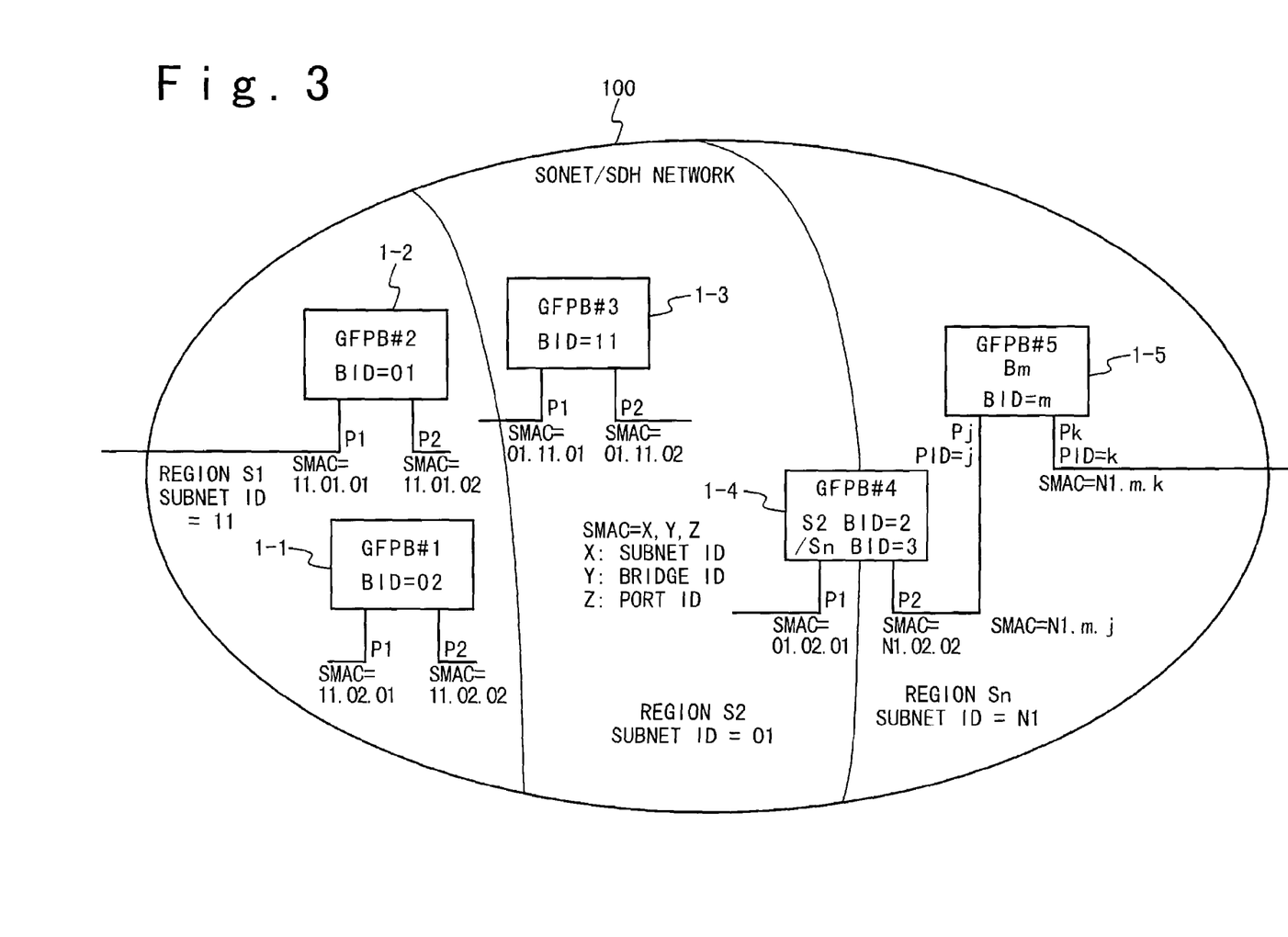
FIG. 3 is a diagram showing the configuration of a SONET/SDH/SDH network according to a first embodiment of the present invention.

FIG. 3 is a diagram showing a configuration example of a SONET/SDH network 100 according to the first embodiment of the present invention. Referring to FIG. 3, the SONET/SDH network 100 connects adjacent LANs (Local Area Network) (not shown). The GFP bridge apparatuses (GFPB#1 to GFPB#5) 1-1 to 1-5 are arranged in the SONET/SDH network 100. GFP is the protocol which is defined in T1X1.5. The SONET/SDH network 100 is divided into optional regions S1 to Sn, each of which is defined as a domain for a subnet, and contains at least one GFP bridge apparatus. Also, subnet identification data (SUBNET IDs) are allocated with the subnets, respectively. It should be noted that the SONET/SDH network 100 is divided such that a transmission route from one subnet to another subnet is one at most. As a method for a single route to the subnet, a spanning tree configuration where any loop does not exist is known.

The GFP bridge apparatuses 1-1 to 1-5 have a function to switch GFP frames, and are allocated with bridge identification data (BIDs), "BID=02", "BID=01", "BID=11", "S2 BID=2/Sn BID=3", "BID=m", respectively. The BID is unique identification data to identify the bridge apparatus in the divided subnet domains S1 to Sn. The GFP bridge apparatus 1-4 belongs to a plurality of subnets S2 and Sn. In this case, a plurality of Node IDs (S2 BID=2/Sn BID=3) are allocated.

The bridge ports P1 to Pk of these GFP bridge apparatuses 1-1 to 1-5 are allocated with port identification data (PORT IDs). Thus, an address is made hierarchical. Hereinafter, the addresses are called in-network MAC addresses.

Figure 5:
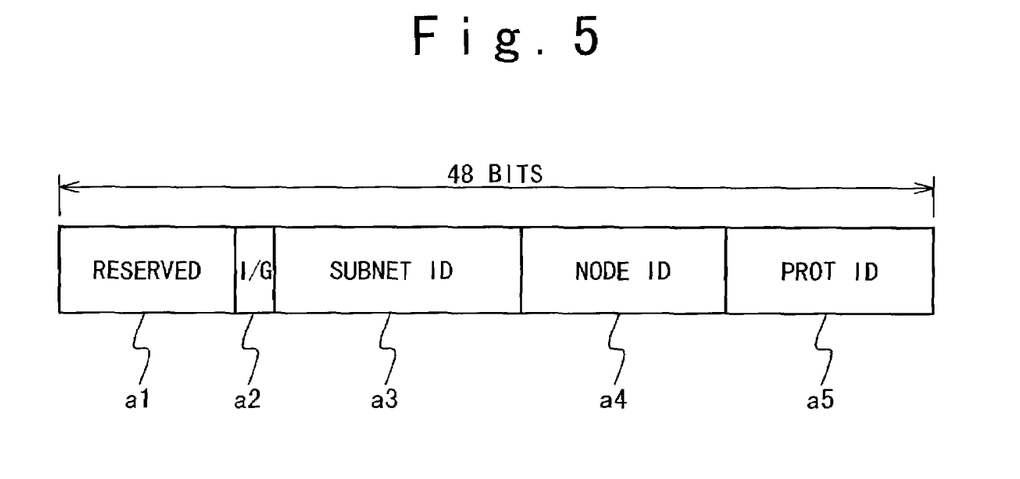
FIG. 5 is a diagram showing a hierarchical in-network MAC address according to the first embodiment of the present invention.

FIG. 5 is a diagram showing the hierarchical in-network MAC address according to the first embodiment of the present invention. Referring to FIG. 5, the in-network MAC address is defined by 48 bits of Address <47-0>, and Address <40> is defined in GFP as I/G bit a2. A region other than the I/G bit of the in-network MAC address is divided into fields. The three fields of them are defined as a subnet identification field (Subnet ID) a3, a bridge identification field (Node ID) a4, a port identification field (Port ID) a5. The field a1 is reserved and called Reserve in FIG. 5.

In case of allocation of the in-network MAC address to the bridge port of the GFP bridge apparatus, the identification data of the subnet to which the GFP bridge apparatus belongs is written the subnet identification field a3. The bridge identification data of the GFP bridge apparatus is written in the bridge identification field a4. The unique port identification data of the GFP bridge apparatus is written in the port identification field a5. Thus, the in-network MAC addresses are allocated to the bridge ports P1 to Pk.

In this way, the in-network MAC addresses of the bridge ports P1 to Pk of FIG. 3 are allocated hierarchically. For example, the in-network MAC address of the port Pk in the bridge Bm of the subnet Sn is 48 bits showing <N1. m. k>. Hereinafter, the in-network MAC address is noted as <Subnet ID, Node ID, Port ID>. The bit widths of these IDs are not defined here. Also, the in-network MAC addresses SMAC (SONET MAC) of the bridge ports are as follows: "SMAC=11. 02. 01", "SMAC=11. 02. 02", "SMAC=11. 01. 01", "SMAC=11. 01. 02", "SMAC=01. 11. 01", "SMAC=01. 11. 02", "SMAC=01. 02. 01", "SMAC=n. 02. 02", "SMAC=n. m. k".

The present invention is presumed that frames are transmitted using the Extension header of a ring frame of GFP. The GFP bridge apparatus carries out a learning process based on the transmission source MAC address in the Extension header of the GFP frame, when receiving the GFP frame through a bridge port, and carries out the registration onto the filtering database.

In FIG. 3, when receiving a GFP frame from any of the bridge ports P1 to Pk, the GFP bridge apparatus 1-1 to 1-5 carries out the learning process based on the transmission source MAC address in the Extension header of the GFP frame and registers the address and the port on the filtering database 12. Here, data to filter the frame of the previously set MAC address is accumulated in the filtering database 12.

Figure 4:
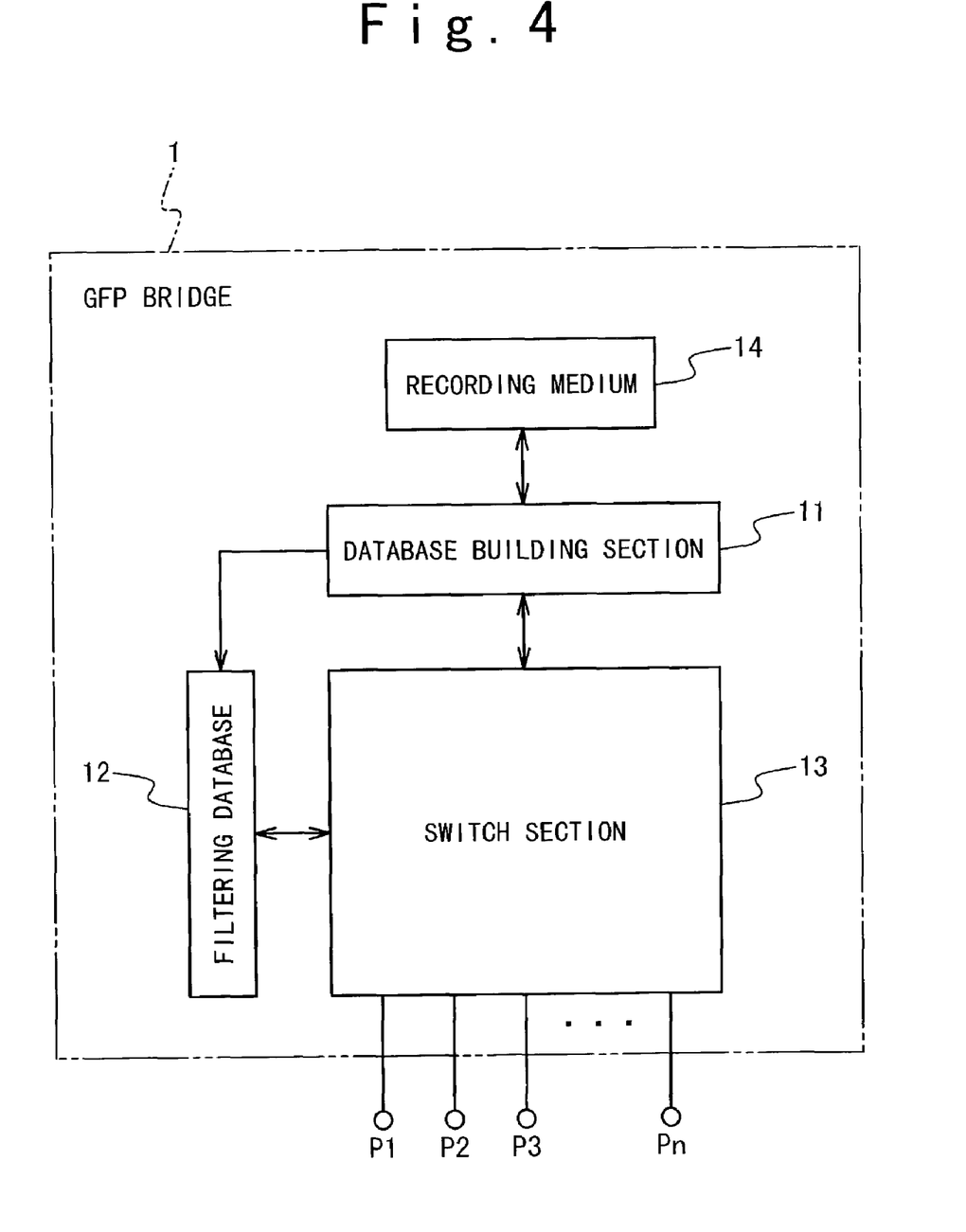
FIG. 4 is a block diagram showing a configuration example of a GFP bridge apparatus in the first embodiment of the present invention.

FIG. 4 is a block diagram showing a configuration example of the GFP bridge apparatus of FIG. 3. Referring to FIG. 4, the GFP bridge apparatus 1 is comprised of a database building section 11, a filtering database 12, a switch section 13, and bridge ports P1 to Pn. The GFP bridge apparatus 1 may be further comprised of a recording medium 14 which stores a filtering database building program. It should be noted that FIG. 4 merely shows one example of the configuration of the GFP bridge apparatus 1 and the present invention can be applied to another configuration example.

The database building section 11 refers to a subnet identification field of a transmission source MAC address of a frame, when the GFP bridge apparatus 1 receives the frame, and determines whether or not the frame has been transmitted from the self-subnet to which the GFP bridge apparatus 1 belongs. When the subnet identification field shows that the frame is transmitted from another subnet, the database building section 11 carries out the learning process based on only the Subnet ID, and registers an address containing only the Subnet ID and a port number through which the frame has been received, on the filtering database 12.

When it is determined to have received the frame transmitted from the self-subnet, the database building section 11 refers to Node ID in the bridge identification field of the transmission source MAC address of the frame to determine whether or not the frame has been transmitted from the self-bridge apparatus which is the GFP bridge apparatus. If the frame has been transmitted from another GFP bridge apparatus, the database building section 11 carries out the learning process based on the Node ID, and registers an address containing Subnet ID and Node ID and the port number through which the frame has been received, on the filtering database 12. Also, when receiving the frame which has been transmitted from the self-bridge apparatus, the database building section 11 carries out the learning process based on Port ID in the port identification field of the transmission source MAC address of the frame and registers an address containing the Subnet ID, the Node ID and the Port ID and the port number through which the frame has been received, on the filtering database 12. A program for the database building section 11 to carry out the above-mentioned process is stored in the recording medium 14.

Next, when a new frame is inputted through any of the bridge ports P1 to Pn, the switch section 13 refers to the filtering database 12 based on the destination address of the new frame to determine one output port to which the new frame is outputted. At this time, the switch section 13 first refers to the filtering database 12 based on the subnet ID in the destination address, to determine the output port. When there is no corresponding Subnet ID, or there are plural corresponding Subnet IDs, the switch section 13 next compares the Node ID in the destination address and the records of the filtering database 12 to determine the output port. When there is no corresponding group of Subnet ID and Node ID, or there are plural corresponding group, the switch section 13 next compares the Port ID in the destination address and the records of the filtering database 12 to determine the output port. If there is corresponding data in the filtering database 12, the switch section 13 outputs the frame to the determined output port of the bridge ports P1 to Pn in accordance with the data. If there is not data, the switch section 13 outputs to all of the bridge ports P1 to Pn other than the bridge port to which the frame is inputted.

It should be noted that although being not illustrated, each of the GFP bridge apparatuses 1-1 to 1-5 of FIG. 3 has the same configuration as the above GFP bridge apparatus 1, and carries out the same operation as the above GFP bridge apparatus 1.

Figure 6:
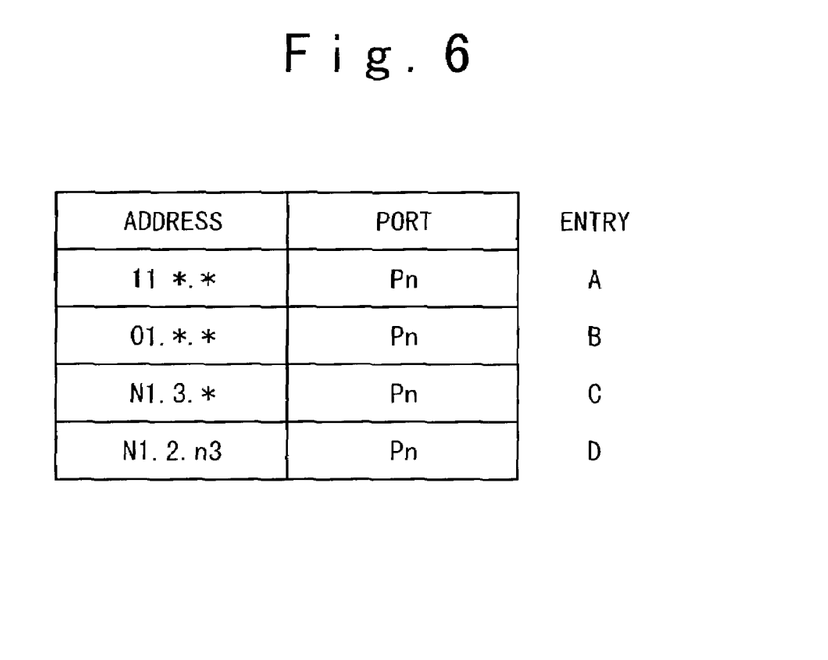
FIG. 6 is a diagram showing a filtering database produced in a GFP bridge apparatus (#5) in the first embodiment.
Figure 7:
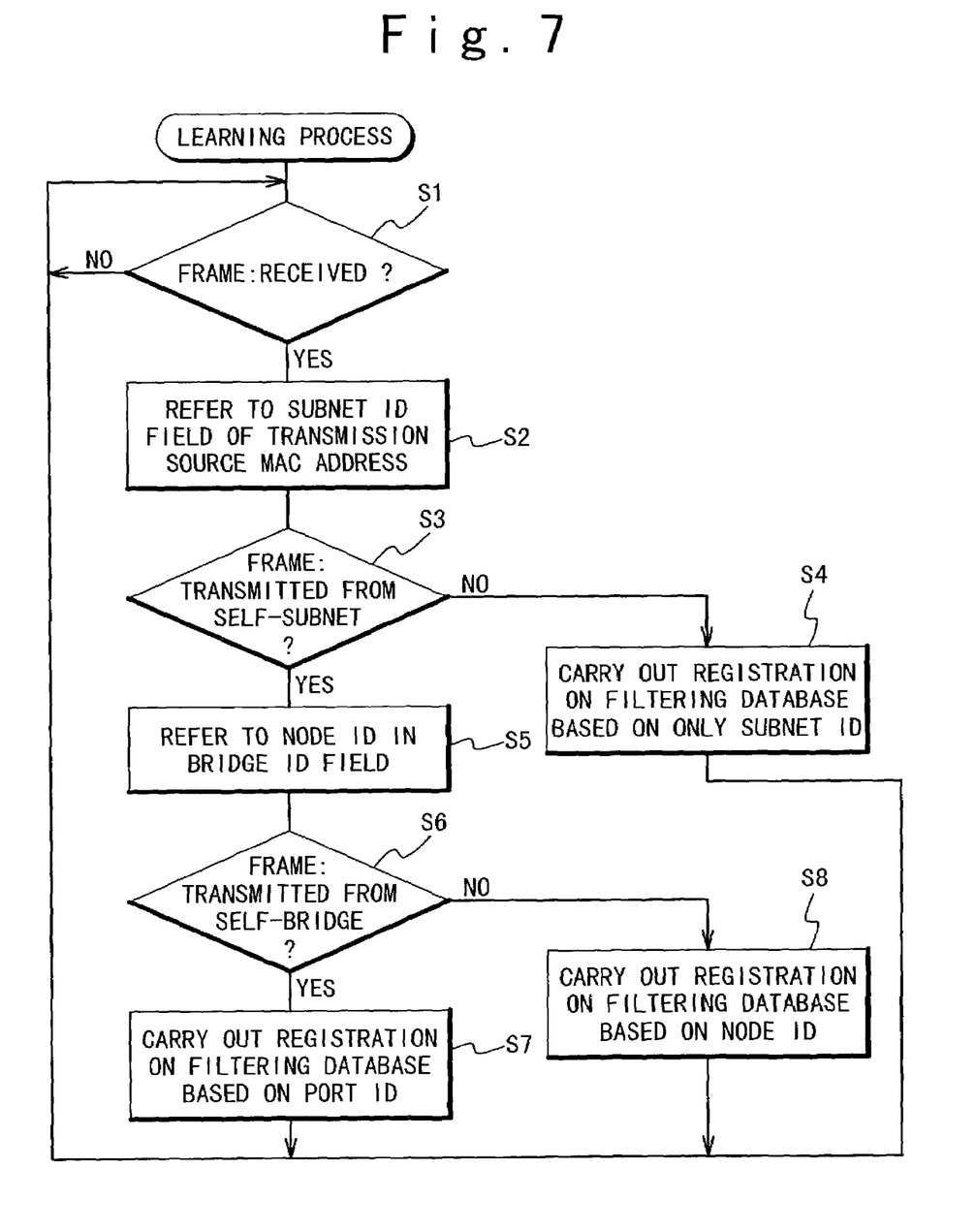
FIG. 7 is a flow chart showing a learning process in the GFP bridge apparatus according to the first embodiment of the present invention.

FIG. 6 is a diagram showing the filtering database produced by the GFP bridge apparatus 1-5 of FIG. 3. FIG. 7 is a flow chart showing the learning process in the embodiment of the present invention. The learning process in the first embodiment of the present invention will be described with reference to FIGS. 3 to 7. Hereinafter, the learning process is supposed to be carried out in the GFP bridge apparatuses 1-5.

When receiving a frame (step S1 of FIG. 7), a database building section 11 of the GFP bridge apparatus 1-5 refers first to the subnet identification field a3 of the transmission source MAC address (step S2 in FIG. 7) to determine whether or not the frame is transmitted from the self-subnet or from another subnet (step S3 in FIG. 7)., When the subnet identification field a3 shows another subnet, the database building section 11 carries out the learning process based on only the Subnet ID. In other words, the database building section 11 registers the Subnet ID on the filtering database 12 (step S4 in FIG. 7).

When receiving the frame transmitted from the subnet to which the GFP bridge apparatus 1-5 belongs, the database building section 11 refers to Node ID in the bridge identification field a4 ((step S5 in FIG. 7), and determines whether the frame is transmitted from the GFP bridge apparatus 1-5 or another GFP bridge apparatus (step S6 in FIG. 7).

If the frame is transmitted from the other bridge, the database building section 11 carries out the learning process based on the Node ID, i.e., registers the Node ID on the filtering database 12 (step S8 in FIG. 7). Also, when receiving the frame transmitted from the GFP bridge apparatus 1-5, the database building section 11 carries out the learning process based on the Port ID in the port identification field a5, i.e., registers the Port ID on the filtering database 12 (step S7 in FIG. 7).

As the presumption in the first embodiment, the route to another subnet is one at most. Therefore, the frame which reaches the GFP bridge apparatus 1-5 from each port of the GFP bridge apparatus 1-1/GFP bridge apparatus 1-2 of FIG. 3 is received by the port which is always the same. In other words, the frames having the same Subnet ID can be collected and grouped as the entry A of the filtering database 12 shown in FIG. 6.

Also, as the presumption of the bridge apparatus, the route to another bridge apparatus in the self-subnet is one at most. Therefore, the frames which reach the GFP bridge apparatus 1-5 from the ports of the other GFP bridge apparatuses in the self-subnet are received from the port which is always the same. In other words, the frames having the same Node ID in the self-subnet can be collected or grouped as the entry C of the filtering database 12 shown in FIG. 6. Here, the learning process is carried out to the frame from the self-bridge apparatus, as the entry D of the filtering database 12 shown in FIG. 6.

In this way, in the first embodiment, the addresses are made hierarchical. Also, the learning process is carried out to collect a plurality of addresses. Therefore, the number of entries of the filtering database 12 of the GFP bridge apparatuses 1-1 to 1-5 can be reduced.

Figure 8:
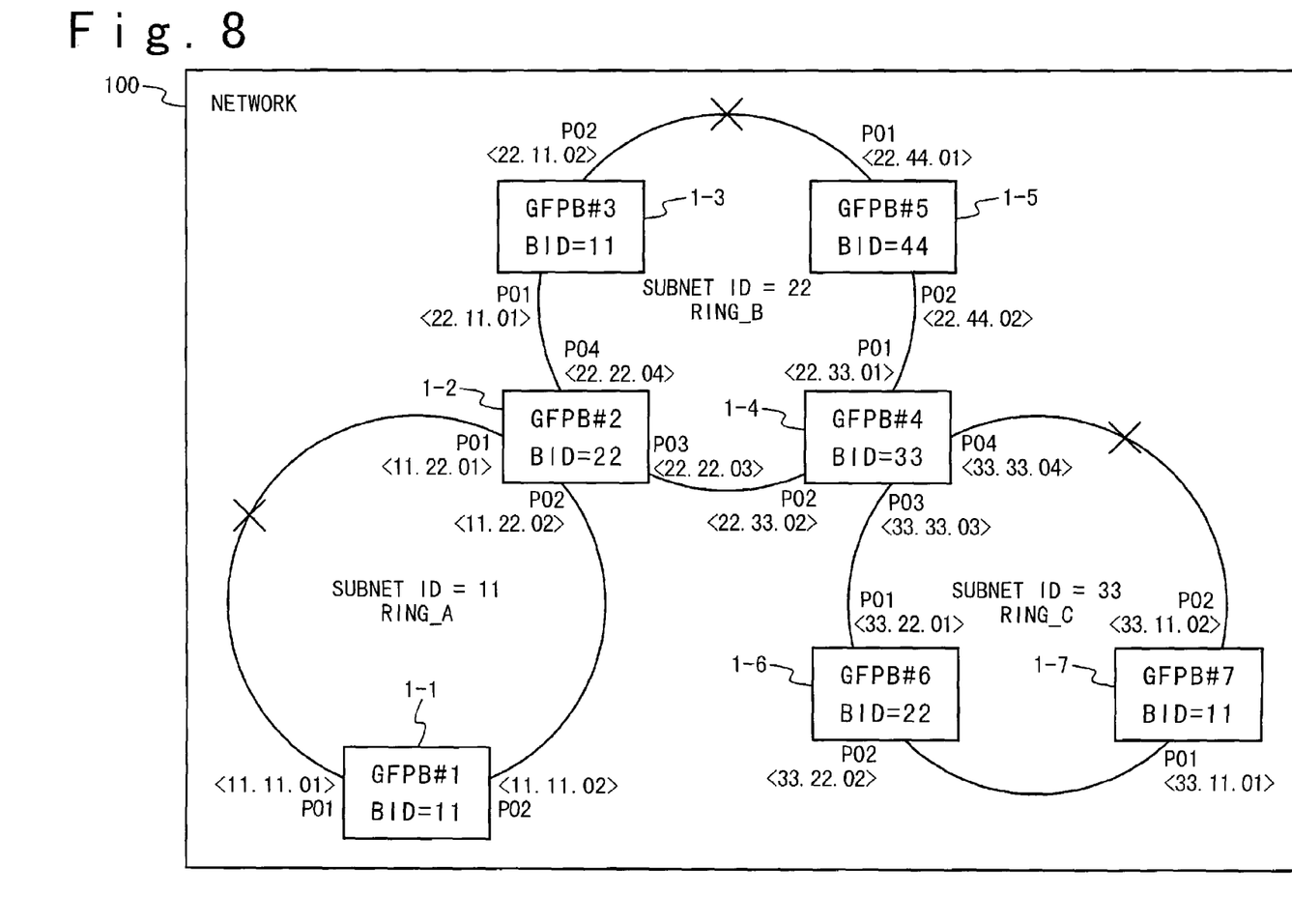
FIG. 8 is a diagram showing an address allocating system according to a second embodiment of the present invention.

FIG. 8 is a diagram showing the address allocation system to the bridge port of the GFP bridge apparatus of the SONET/SDH ring network according to the second embodiment of the present invention. Referring to FIG. 8, the network 100 takes multi-ring topology of rings; Ring_a, Ring_b, and Ring_c.

Here, it is supposed that the rings Ring_a, Ring_b, and Ring_c in the network 100 are subnets in units of the rings. Also, it is supposed that Subnet IDs ("Subnet ID=11", "Subnet ID=22", "Subnet ID=33") are allocated for the respective rings Ring_a, Ring_b, and Ring_c. Moreover, the route from each of the rings Ring_a, Ring_b, and Ring_c to the other ring must be always within one. In the second embodiment, the method of limiting the number of routes is not defined especially.

In the rings Ring_a, Ring_b, and Ring_c, identification numbers ("BID=11", "BID=22", "BID=33", "BID=44") are allocated to the GFP bridge apparatuses 1-1 to 1-7. Also, identification numbers are allocated to the bridge ports P01 to P04 in the bridge. Based on the allocated identification numbers, the bridge ports are allocated with the in-network MAC addresses (<11. 11. 01>, <11. 11. 02>, <11. 22. 01>, <11. 22. 02>, <22. 11. 01>, <22. 11. 02>, <22. 22. 01>to <22. 22. 04>, <22. 33. 01>, <22. 33. 02>, <22. 44. 01>, <22. 44. 02>, <33. 11. 01>, <33. 11. 02>, <33. 22. 01>, <33. 22. 02>). In this case, the in-network MAC address is defined in the hierarchy structure of Subnet ID, Node ID, and Port ID. The domain division is optionally defined but the definition is same as the in-network MAC address shown in the above-mentioned FIG. 5.

When receiving a frame from the bridge ports P01 to P04, each of the GFP bridge apparatuses 1-1 to 1-7 carries out the learning process based on the transmission source MAC address in the GFP header and registers data in the GFP header on the filtering database (not shown). In this case, the GFP bridge apparatus 1-1 to 1-7 refers to Subnet ID of the transmission source MAC address and determines from which of rings the frame is transmitted. If data in the Subnet ID field shows another ring, the GFP bridge apparatus 1-1 to 1-7 carries out the learning process based on the Subnet ID.

When receiving the frame transmitted from the ring to which the self-bridge belongs, the GFP bridge apparatus (#1 to #7) refers to the bridge identification field, determines whether or not the frame has been transmitted from the self-bridge apparatus or the other bridge apparatus. If the frame has been transmitted from the other bridge apparatus, the GFP bridge apparatus 1-1 to 1-7 carries out the learning process based on the Node ID. The GFP bridge apparatus 1-1 to 1-7 carries out the learning process based on the Port Id in the port identification field when receiving the frame transmitted from the self-bridge apparatus.

Figure 9:
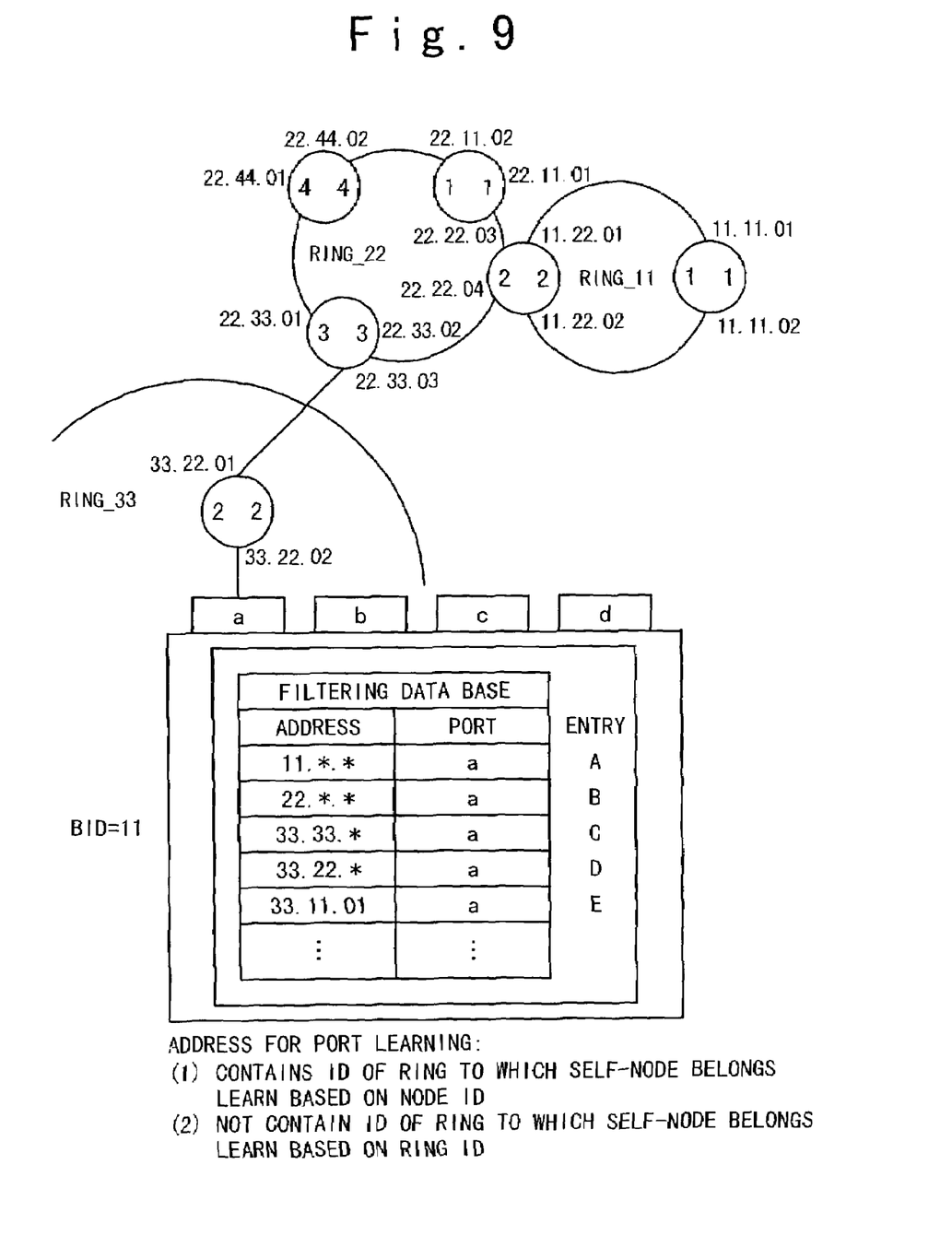
FIG. 9 is a diagram showing the filtering database produced in GFP bride apparatus in the second embodiment.

FIG. 9 is a diagram showing the filtering database which is produced in the above-mentioned system in the GFP bridge apparatus 1-7 of FIG. 8. Referring to FIG. 9, an entry A is produced by collecting the ports of ring Ring_a. Entries C and D are produced by collecting the ports of the other bridge apparatus in the self-ring. An entry E is an entry for the port of the self-bridge apparatus.

If a route to another subnet is always one, the frames transmitted from the other subnets are aggregated. Therefore, the number of entries can be decreased compared with the conventional filtering database. In this way, the in-network MAC addresses are made hierarchical and the entries are collected using the hierarchical structure in case of building the filtering database. Therefore, the number of entries can be reduced compared with the conventional filtering database.

As described above, according to the present invention, each of a plurality of the bridge apparatuses has bridge ports to which layered addresses are allocated which contain the subnet identification data at least. Thus, by carrying out registration onto the filtering database based on the layered address of the reception frame, the number of entries of the filtering database in the bridge apparatus can be reduced.

What is claimed is:

1. A bridge apparatus comprising:
    a filtering database which stores sets of a source address of a transmission source bridge apparatus from which a frame has been transmitted and one of ports of said bridge apparatus through which said frame is received, wherein said transmission source bridge apparatus address comprises a subnet ID, a node ID and a port ID, said subnet ID is an ID allocated to a subnet to which said transmission source bridge apparatus belongs, said node ID is an ID allocated to said transmission source bridge apparatus, and said port ID is an ID allocated to each of ports of said transmission source bridge apparatus; and
    a switch section which is connected with said ports of said bridge apparatus and refers to said filtering database based on a destination address of a transmission frame to determine one port of said bridge apparatus as an output port from which said transmission frame is outputted, when said transmission frame is received through another of said ports of said bridge apparatus.

2. The bridge apparatus according to claim 1, wherein said switch section refers to said filtering database based on one of a first address group of said subnet ID, a second address group of said subnet ID and said node ID, and a third address group of said subnet ID, said node ID and said port ID.

3. The bridge apparatus according to claim 2, wherein said ports are grouped based on each of said first to third address groups.

4. The bridge apparatus according to claim 1, wherein said switching section:
    refers to said filtering database based on said subnet ID of said destination address of said transmission frame to check whether said destination address of said transmission frame belongs to the subnet to which said bridge apparatus belongs, and
    determines said output port based on said subnet ID when said destination address does not belong to the subnet to which said bridge apparatus belongs.

5. The bridge apparatus according to claim 4, wherein said switching section:
    refers to said filtering database based on said node ID of said destination address to check whether said node ID of said destination address of said transmission frame is same as said node ID of said bridge apparatus, when said destination address does not belong to the subnet to which said bridge apparatus belongs;
    determines said output port based on said subnet ID and said node ID when said node ID of said destination address of said transmission frame is not same as said node ID of said bridge apparatus; and
    determines said output port based on said subnet ID, said node ID and said port ID of said destination address when said node ID of said destination address of said transmission frame is same as said node ID of said bridge apparatus.

6. The bridge apparatus according to claim 1, wherein a transmission route from one subnet to another subnet is at most one.

7. The bridge apparatus according to claim 1, further comprising:

a building section which:
    checks whether a source address of said frame belongs to the subnet to which said bridge apparatus belongs, and
    registers said subnet ID as said address and said output port through which said frame has received, on said filtering database when said source address does not belong to the subnet to which said bridge apparatus belongs.

8. The bridge apparatus according to claim 7, wherein said building section:
    checks whether said node ID of said source address of said frame is same as said node ID of said bridge apparatus, when said source address belongs to the subnet to which said bridge apparatus belongs;
    registers a group of said subnet ID and said node ID as said address and said output port which said frame has received, on said filtering database when said node ID of said source address of said frame is not same as said node ID of said bridge apparatus; and
    registers a group of said subnet ID, said node ID and said port ID of said source address as said address and said output port which said frame has received, on said filtering database when said node ID of said source address of said frame is same as said node ID of said bridge apparatus.

9. A network comprising a plurality of bridge apparatuses, wherein said network is divided into a plurality of subnets, and each of said plurality of bridge apparatuses belongs to one or more of said plurality of subnets, and
    wherein each of said plurality of bridge apparatuses comprises:
    a filtering database which stores sets of a source address of a transmission source bridge apparatus from which a frame has been transmitted and one of ports of said bridge apparatus through which said frame is received, wherein said transmission source bridge apparatus address comprises a subnet ID, a node ID and a port ID, said subnet ID is an ID allocated to a subnet to which said transmission source bridge apparatus belongs, said node ID is an ID allocated to said transmission source bridge apparatus, and said port ID is an ID allocated to each of ports of said transmission source bridge apparatus; and
    a switch section which is connected with said ports of said bridge apparatus and refers to said filtering database based on a destination address of a transmission frame to determine one port of said bridge apparatus as an output port from which said transmission frame is outputted, when said transmission frame is received through another of said ports of said bridge apparatus.

10. The network according to claim 9, wherein said bridge apparatus further comprises:
    a building section which:
    checks whether a source address of said frame belongs to the subnet to which said bridge apparatus belongs, and
    registers said subnet ID as said address and said output port through which said frame has received, on said filtering database when said source address does not belong to the subnet to which said bridge apparatus belongs.

11. The network according to claim 10, wherein said building section:
    checks whether said node ID of said source address of said frame is same as said node ID of said bridge apparatus, when said source address belongs to the subnet to which said bridge apparatus belongs;
    registers a group of said subnet ID and said node ID as said address and said output port which said frame has received, on said filtering database when said node ID of said source address of said frame is not same as said node ID of said bridge apparatus; and
    registers a group of said subnet ID, said node ID and said port ID of said source address as said address and said output port which said frame has received, on said filtering database when said node ID of said source address of said frame is same as said node ID of said bridge apparatus.

12. A method of transferring a frame in a specific bridge apparatus of a network based on a filtering database, comprising the steps of:
    dividing a network of a plurality of bridge apparatuses into a plurality of subnets, to allocate a subnet ID to each of said plurality of subnets, each of said plurality of bridge apparatuses being allocated with a node ID and having a plurality of ports, each of which is allocated with a port ID;
    in said specific bridge apparatus, checking whether a source address of a frame belongs to the subnet to which said specific bridge apparatus belongs, when said frame is received through one of said ports of said specific bridge apparatus as an output port; and
    in said specific bridge apparatus, registering said subnet ID as said address and said output port on said filtering database when said source address does not belong to the subnet to which said specific bridge apparatus belongs.

13. The method according to claim 12, further comprising the steps of:
    in said specific bridge apparatus, checking whether said node ID of said source address of said frame is same as said node ID of said specific bridge apparatus, when said source address belongs to the subnet to which said specific bridge apparatus belongs;
    in said specific bridge apparatus, registering a group of said subnet ID and said node ID as said address and said output port on said filtering database when said node ID of said source address of said frame is not same as said node ID of said specific bridge apparatus; and
    in said specific bridge apparatus, registering a group of said subnet ID, said node ID and said port ID of said source address as said address and said output port on said filtering database when said node ID of said source address of said frame is same as said node ID of said specific bridge apparatus.

14. The method according to claim 13, further comprising the steps of:
    in said specific bridge apparatus, referring to said filtering database based on said subnet ID of a destination address of a transmission frame to check whether said destination address of said transmission frame belongs to the subnet to which said specific bridge apparatus belongs; and
    in said specific bridge apparatus, determining said output port based on said subnet ID when said destination address does not belong to the subnet to which said specific bridge apparatus belongs.

15. The method according to claim 14, further comprising the steps of:
    in said specific bridge apparatus, referring to said filtering database based on said node ID of said destination address to check whether said node ID of said destination address of said transmission frame is same as said node ID of said specific bridge apparatus, when said destination address does not belong to the subnet to which said specific bridge apparatus belongs;

in said specific bridge apparatus, determining said output port based on said subnet ID and said node ID when said node ID of said destination address of said transmission frame is not same as said node ID of said specific bridge apparatus; and in said specific bridge apparatus, determining said output port based on said subnet ID, said node ID and said port ID of said destination address when said node ID of said destination address of said transmission frame is same as said node ID of said specific bridge apparatus.

* * * * *